United States Patent
Fani et al.

(10) Patent No.: US 7,663,996 B2
(45) Date of Patent: Feb. 16, 2010

(54) TRACK JUMPING FOR OPTICAL RECORDING MEDIA

(75) Inventors: Eric Fani, Villingen-Schwenningen (DE); Christian Büchler, Villingen-Schwenningen (DE); Gerhard Reiner, Villingen-Schwenningen (DE)

(73) Assignee: Thomson Licensing, Boulogne Billancourt (FR)

( * ) Notice: Subject to any disclaimer, the term of this patent is extended or adjusted under 35 U.S.C. 154(b) by 601 days.

(21) Appl. No.: 10/838,546

(22) Filed: May 4, 2004

(65) Prior Publication Data

US 2004/0240338 A1 Dec. 2, 2004

(30) Foreign Application Priority Data

May 7, 2003 (EP) .................................. 03010261

(51) Int. Cl.
*G11B 7/00* (2006.01)
(52) U.S. Cl. ............... 369/53.12; 369/53.14; 369/44.27
(58) Field of Classification Search ............... 369/44.27, 369/44.28, 44.29, 53.14, 53.15, 53.13, 44.32, 369/30.27, 53.12, 53.32
See application file for complete search history.

(56) References Cited

U.S. PATENT DOCUMENTS

| | | | |
|---|---|---|---|
| 4,495,608 A | | 1/1985 | Kimura et al. |
| 4,745,587 A | * | 5/1988 | Maeda et al. ............. 369/30.27 |
| 5,577,009 A | | 11/1996 | Takamine |
| 5,621,709 A | | 4/1997 | Takahashi |
| 5,998,776 A | | 12/1999 | Ogura |
| 6,118,739 A | * | 9/2000 | Kishinami et al. ....... 369/44.28 |
| 6,314,066 B1 | | 11/2001 | Hong et al. |

FOREIGN PATENT DOCUMENTS

| | | |
|---|---|---|
| DE | 10026068 A1 | 5/2000 |
| JP | 9-027132 | 1/1997 |
| JP | 10-11766 | 1/1998 |

OTHER PUBLICATIONS

English translation of JP 10-011766.*
English translation of JP 10-112039.*
Japanese Patent Abstract; U.S. Appln No. 09119813; Appln date May 3, 1997; Title: Track Jump Device for Optical Pickup and Generation Method for its Tracking Driving Signal; Pub. No. 10312549 Pub date Nov. 24, 1998.
Japanese Patent Abstract; Appln No. 08264955; Appln date Oct. 4, 1996 Title: Optical Disk Device and Optical Disk Driving Method; Pub. No. 10112039 Pub. Date Apr. 28, 1998.
Japanese Patent Abstract; Appln No. 08166313; Appln date Jun. 26, 1996 Title: Disk-Like Optical Recording Medium Recording/Reproducing Device, and Disk-Like Optical Recording Medium Pub. No. 10011766 Pub. Date Jan. 16, 1998 (Corresponds to AL**).

(Continued)

*Primary Examiner*—Nabil Z Hindi
(74) *Attorney, Agent, or Firm*—Robert D. Shedd; Harvey D. Fried; Patricia Verlangieri

(57) ABSTRACT

A method for track jumping for optical recording media exhibiting eccentricity, and to an apparatus for reading from and/or writing to optical recording media using such method is disclosed. The method for track jumping for optical recording media exhibiting eccentricity, whereby a sled and/or an actuator are moved from a start track to an end track, includes the steps of: determining the eccentricity of the optical recording medium, initiating the track jump at minimum eccentric acceleration, and completing the track jump at minimum eccentric acceleration.

9 Claims, 1 Drawing Sheet

OTHER PUBLICATIONS

Japanese Patent Abstract; Appln No. 2001214484; Appln date Jul. 13, 2001 Title: Disk Recording and Reproducing Device, and Disk Recording and Reproducing Method; Pub. No. 2003030864; Pub. Date Jan. 31, 2003.

* cited by examiner

TRACK JUMPING FOR OPTICAL RECORDING MEDIA

FIELD OF THE INVENTION

The present invention relates to a method for track jumping for optical recording media exhibiting eccentricity, and to an apparatus for reading from and/or writing to optical recording media using such method.

BACKGROUND OF THE INVENTION

On optical recording media such as, for example, CD and DVD, data is stored in the form of pits following tracks. Recordable media, such as DVD-RAM or DVD-RW, often use land-groove track structures, where data is written either in the grooves or both in the lands and the grooves. The tracks are centered relative to the center of the optical recording medium, either in the form of concentric circles or as a spiral. Favorably, the center of the tracks corresponds to the axis of rotation of the optical recording medium upon playback in an apparatus for reading from and/or writing to optical recording media. However, due to manufacturing tolerances of the optical recording medium and/or the drive of the apparatus, during playback or recording the center of the tracks does generally not coincide exactly with the axis of rotation. In other words, the optical recording medium exhibits eccentricity. The eccentricity affects the accuracy of track counting during a track jump, and, therefore, increases the time needed for accessing a specific track on the optical recording medium. During a track jump, the tracking loop of the servo controller, i.e. the control loop which ensures that the light beam used for reading and/or writing remains centered relative to the track, has to be opened. Once the track jump is finished, the tracking loop is closed again. As long as the tracking loop is opened, the eccentricity causes interfering activity on the tracking error signal, without any indication whether the light beam is moving inwards or outwards. This leads to an erroneous track counting.

For optical recording media exhibiting a difference in reflectivity between lands and grooves, a solution for this problem is found in using two signals for counting the number of tracks which are being crossed during a track jump. The first signal is the tracking error signal, the second signal is a mirror signal. Both signals are obtained as a combination of photodetector signals. By monitoring the phase relationship between these signals, it is possible to determine whether the light beam is moving inwards or outwards while the tracking loop is opened. This allows to compute the number of tracks which are being crossed during a track jump with sufficient accuracy, even under the influence of eccentricity.

However, recordable optical recording media such as, for example, DVD+RW do only exhibit a very small or even no difference in reflectivity between lands and grooves in the unrecorded areas. During a track jump the system has to rely solely on the tracking error signal for track counting. This signal, however, does not give any indication on the interfering influence of the eccentricity during the track jump.

To alleviate the above problem, JP 10-112039 discloses a method to improve the random access stability of an optical disk memory device. The device is provided with an eccentricity detecting circuit, which discriminates the direction of the eccentricity of the disk and the eccentric acceleration from the tracking error signal. Eccentric acceleration here denotes the acceleration of a track relative to its mean position caused by eccentricity. When a track jump is to be performed, a track jump enable signal generating circuit determines the track jump start timing from the obtained eccentricity condition, the track jump direction, the number of tracks crossed during the jump, and the relationship with the current rotation speed of the disk. The track jump is then initiated with an optimum timing against the disk eccentricity.

It is an object of the invention to improve the methods known from prior art.

SUMMARY OF THE INVENTION

According to the invention, a method for track jumping for optical recording media exhibiting eccentricity, whereby a sled and/or an actuator are moved from a start track to an end track, comprises the steps of determining the eccentricity of the optical recording medium, initiating the track jump at minimum eccentric acceleration, and completing the track jump at minimum eccentric acceleration. By completing the track jump at minimum eccentric acceleration it is ensured that the influence of the eccentricity of the recording medium on the track counting is minimized, which leads to a more reliable track jump. The condition of minimum eccentric acceleration occurs only two times per revolution, which is approximately every 10 ms. For short jumps these time slots are very challenging. Also for long jumps the sled traverse speed has to be selected carefully to exactly match the optimum landing condition. Acquisition of data on the eccentricity of the recording medium is advantageously performed on the fly, i.e. during normal operation with closed tracking loop. It is, however, also possible to perform data acquisition only at the time when a track jump is to be initiated. The data on the eccentricity is favourably obtained from a tracking error signal or a signal comparable to a tracking error signal, which is not necessarily used as a tracking error signal. Of course, other methods for obtaining the data can also be used.

Advantageously, the method further comprises the step of setting the rotation of the optical recording medium to constant angular velocity before initiating the track jump. This allows a reduction in the computation power and, consequently, the hardware expenses necessary for a phase control operation. By setting the rotation to constant angular velocity it is ensured that the eccentricity at the destination track is the same as the eccentricity at the start track if the track jump is performed in a period of time corresponding to an integer multiple of the time needed for a complete rotation of the optical recording medium. This allows one to easily calculate the necessary travelling speed of the sled and/or the actuator by simply determining the time needed for a single rotation of the optical recording medium at the current angular velocity and comparing this time with the time needed for accelerating and braking the sled and/or the actuator and the time needed for crossing the tracks when the sled and/or the actuator travel with the calculated speed. Preferably these values are stored in a table within the apparatus for reading from and/or writing to optical recording media.

The step of initiating the track jump preferably comprises starting the movement of the sled and/or the actuator. This ensures that the sled and/or the actuator arrive at the destination track at the calculated time. The necessary calculations for determining the travelling speed and for setting the rotation to constant angular velocity are advantageously performed before the track jump is initiated. Otherwise a delay in one of the operations could lead to a delayed movement of the sled and/or the actuator, which would then arrive at the destination track at a wrong time. Preferably, a track jump enable signal is emitted when the track jump preparations are finished. It is of course, also possible to initiate the track jump by performing the necessary calculations. However, in this case the time needed for calculating has to be taken into account when the travelling speed of the sled and/or the actuator is determined. In this case a safety margin for the track jump preparation is advantageously provided.

According to the invention, the method further comprises the step of opening a tracking control loop shortly before starting the movement of the sled and/or the actuator. This has the advantage that the tracking control loop is ready for track counting when the movement of the sled and/or the actuator is started at minimum eccentric acceleration. Though the track counting is preferably done by a separate hardware counter, this hardware counter uses the track zero cross signal as an input signal. Opening the tracking control loop shortly before starting the movement of the sled and/or the actuator further allows one to take into account the inertia of the mechanical components and the processing time of the controller. In practise, however, opening the control loop and starting the movement of the sled occur almost simultaneously since the microcontrollers, which are available today, are very fast.

Preferably, the step of completing the track jump comprises closing the tracking control loop. In this way the tracking control loop is closed at the time of minimum eccentric acceleration. This helps to make the track jump more reliable, since the risk that the tracking control loop loses the track due to the eccentricity is greatly reduced. Though during normal operation the tracking control loop is not very likely to lose the track, just after closing the loop has to stabilize and is more susceptible to distortions such as eccentricity.

Advantageously, the method further comprises the step of finishing the movement of the sled and/or the actuator shortly before closing the tracking control loop. This step ensures that the tracking control loop is ready for closing at minimum eccentric acceleration. Otherwise it could occur that the tracking control loop is closed too late and the destination track is lost due to the distortions caused by the eccentric acceleration.

Preferably, the forced movement of the sled and/or the actuator is finished before arriving at the destination track. This allows one to take into account the time which is needed for braking the sled and/or the actuator. Otherwise the sled and/or the actuator could overshoot the destination track during braking. The necessary offset, which for the track jump is subtracted from the number of tracks between the start track and the destination track, is advantageously determined empirically by the designer of the apparatus for reading from and/or writing to optical recording media. The offset may vary with the length of the track jump and/or the travelling speed of the sled and/or the actuator. Offset values are preferably stored in a table within the apparatus.

Advantageously, the eccentricity of the optical recording medium is determined from a tracking error signal. Since means for generating a tracking error signal are provided anyway, no additional hardware has to be introduced for this purpose. This helps to reduce the cost for implementing the method according to the invention. Usually a PID controller is used for tracking control. The integral part of the controller tries to compensate for the eccentricity and can, therefore, be used as a measurement tool for the eccentricity. In this case it is not the tracking error signal directly which is used, but the reaction of the controller to this signal. In a standard PID controller design the task of the integral part of the controller is to eliminate the deviation which remains if just a proportional part is present. In a tracking servo control loop the PID controller tries to keep the track actuator in the center position of the track. As every disc is eccentric to a certain extent this results in an actuator movement in radial direction back and forth. If only a proportional part is present this compensation movement is not sufficient, which means that there is a remaining deviation from the mid center position of the track. This deviation is proportional to the elongation of the actuator due to eccentricity. To overcome this problem the integral part of the controller is introduced. This part compensates for the deviation until a mid center position is reached. As the integral part that has to be added is proportional to the elongation of the actuator it can be used as a measure for the eccentricity itself. Of course, it has to be taken into account that depending on the gain and time constant of the integral part there is a phase delay between maximum eccentricity and maximum integral control output. Of course, other methods for determining the eccentricity can also be provided.

Preferably, an apparatus for reading from and/or writing to recording media uses a method according to the invention for track jumping. Such an apparatus performs very reliable track jumps, which leads to a reduced random access time. For every track jump which does not arrive at the desired destination track, a further, shorter correction track jump is necessary. By ensuring that the sled and/or the actuator arrive essentially at or very close to the desired destination track, the correction track jumps become obsolete.

BRIEF DESCRIPTION OF THE DRAWINGS

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
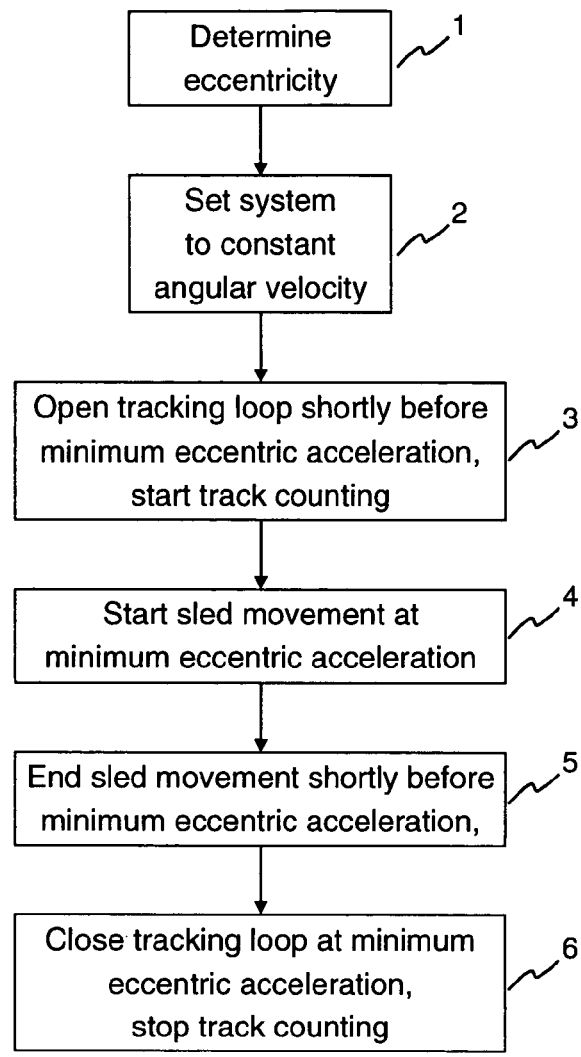
FIG. 1 shows a method for track jumping according to the invention.

A method for track jumping according to the invention is shown schematically in FIG. 1. Before a track jump is executed, in a first step 1 data on the eccentricity of the recording medium is acquired and the eccentricity is determined. This is preferably done on the fly, i.e. during normal operation with closed tracking loop, preferably as a part of the general alignments that are done during start up of a new recording medium. It is, of course, also possible to determine the eccentricity only at the time when a track jump is to be performed, e.g. by using the reaction of the PID controller. However, this will significantly increase the time needed for the track jump. Once the eccentricity has been evaluated, the angular position of the disc measured by a dedicated counter is taken into account for determining at which point of the recording medium a jump can be initiated. In order to simplify the phase control operation and to reduce the required computation power, in the next step 2 the system is set to a constant angular velocity. Though in this way the method is simplified considerably, the method can also be performed without setting the system to constant angular velocity. Furthermore, it is likewise possible to increase or decrease the angular velocity to reach the point of minimum eccentric acceleration faster. However, it should be ensured that the time needed for acceleration or deceleration does not vitiate this beneficial effect. In both cases the change of the rotation speed has to be taken into account during a track jump. Shortly before the minimum eccentric acceleration is reached, e.g. 1 ms, which represents 1 cm on the recording medium (at 3000 rotations per minute along a 20 cm track, v=10 m/s), in a step 3 the tracking loop is opened and a track counting is started. Another method for determining the correct point of time is to use a frequency counter which measures the track crossing frequency. If this frequency drops below approximately 1 kHz a good point for starting the track jump has been reached. The track counting is based on the tracking error signal. The track counting allows to determine the number of tracks which have been crossed so far during the track jump. The minimum eccentric acceleration denominates the point in time when the absolute value of the acceleration of the track relative to its mean position is essentially zero. At minimum eccentric acceleration, in a step 4 the movement of the sled and/or the actuator relative to the recording medium, i.e. the track jump is initiated. The sled continues its movement until the track counting indicates that a previously calculated number of tracks, which corresponds to the jump from the start track to the destination track, has been crossed. In a step 5, shortly before the minimum eccentric acceleration is reached, the forced sled movement is stopped. Advantageously, an empirically determined offset is subtracted from the calculated number of tracks. For precise working controllers this offset can be as low as 0 or 1. This allows to compensate for the distance that the sled continues to travel before it comes to a complete stop. At essentially minimum eccentric acceleration, in a step 6 the tracking loop is closed again and the track counting is stopped. Preferably the tracking loop is closed as soon as the correct track has been reached. If a traverse speed controller is used, which controls the track crossing frequency, at the end of the jump the track crossing frequency has reached a minimum so that the tracking loop is closed again. With step 6 the track jump is completed.

Figure 2:
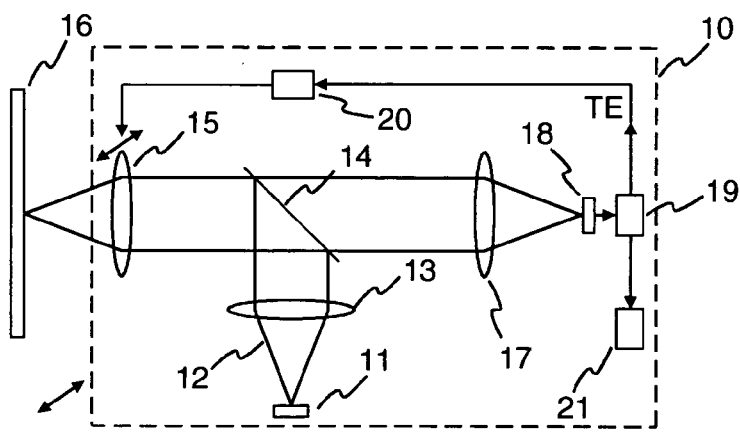
FIG. 2 schematically shows an apparatus for reading from and/or writing to optical recording media using the method.

In FIG. 2 an apparatus for reading from and/or writing to optical recording media 16 using the method according to the invention is shown schematically. The apparatus comprises a sled 10, which can be moved relative to the surface of the optical recording medium 16 to access different areas of the optical recording medium (coarse tracking). The sled 10 carries a light source 11 emitting a light beam 12 for scanning a recording layer of the optical recording medium 16. The light beam 12 is collimated by a collimator 13 before it is diverted by means of a beam splitter 14. An objective lens 15 focuses the light beam 12 onto a track of the optical recording medium 16, the track carrying information. The objective lens 15 can be moved relative to the track by an actuator (not shown) for ensuring that the light beam 12 is kept as close as possible to the track center (fine tracking). Part of the light beam 12 is reflected from the recording layer. The reflected light is collimated by the objective lens 15 and imaged onto a photodetector 18 by means of a further objective lens 17. The signals obtained from the photodetector 18 are fed to an evaluation unit 19, which generates a tracking error signal TE. This tracking error signal TE is on the one hand supplied to a tracking regulator 20 controlling the position of the objective lens 15, and on the other hand also transmitted to a track jump controller 21. The track jump controller 21 determines the eccentricity of the optical recording medium 16, controls the movement of the sled 10 during a track jump, and performs track counting during the track jump. When a track jump is initiated, the track jump controller 21 ensures that the tracking loop controlling the position of the objective lens 15 is opened shortly before the optical recording medium 16 is at the position of minimum eccentric acceleration. It further ensures that the sled 10 starts to move when the optical recording medium 16 has reached the position of minimum eccentric acceleration. At the end of the track jump the track jump controller 21 guarantees that the movement of the sled 10 is stopped shortly before the optical recording medium 16 is at the position of minimum eccentric acceleration, and closes the tracking loop when the optical recording medium 16 has reached the position of minimum eccentric acceleration. During the movement of the sled, the track jump controller 21 performs a track counting operation for determining the number of tracks which have been crossed so far during the track jump. The track counting operation ensures that the movement of the sled is stopped before the destination track is crossed.

What is claimed is:

1. Method for track jumping for optical recording media exhibiting eccentricity, whereby a sled and/or an actuator are moved from a start track of a recording layer to an end track of the recording layer, including the steps of:

determining the eccentricity of the optical recording medium, initiating the track jump at minimum eccentric acceleration, counting tracks using a tracking error signal;

crossing one or more tracks within the recording layer, and completing the track jump at minimum eccentric acceleration.

2. Method according to claim 1, further including the step of setting the rotation of the optical recording medium to constant angular velocity before initiating the track jump.

3. Method according to claim 1, wherein the step of initiating the track jump includes starting the movement of the sled and/or the actuator.

4. Method according to claim 3, further including the step of opening a tracking control loop shortly before starting the movement of the sled and/or the actuator.

5. Method according to claim 1, wherein the step of completing the track jump includes closing the tracking control loop.

6. Method according to claim 5, further including the step of finishing the movement of the sled and/or the actuator shortly before closing the tracking loop.

7. Method according to claim 6, wherein the movement of the sled and/or the actuator is finished before arriving at the destination track.

8. Method according to anyone of the preceding claims, wherein the eccentricity of the optical recording medium is determined from a tracking error signal.

9. Apparatus for reading from and/or writing to recording media, wherein it uses a method according to claim 1 for track jumping.

* * * * *